June 27, 1939.　　P. D. GERMOND　　2,163,675
HYDRAULIC LIFT TRUCK
Filed Sept. 26, 1936　　5 Sheets-Sheet 1
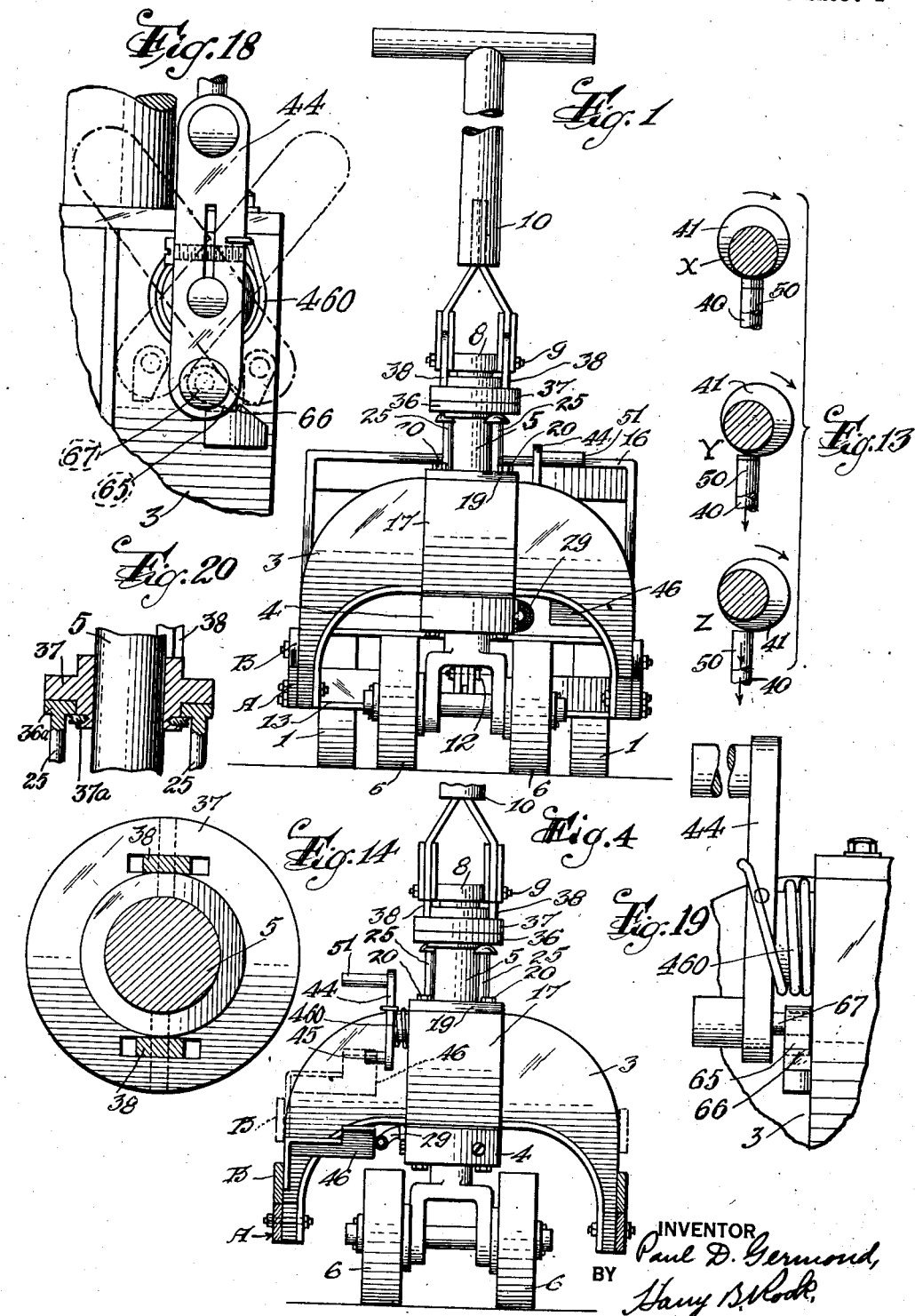

June 27, 1939.　　P. D. GERMOND　　2,163,675
HYDRAULIC LIFT TRUCK
Filed Sept. 26, 1936　　5 Sheets-Sheet 2
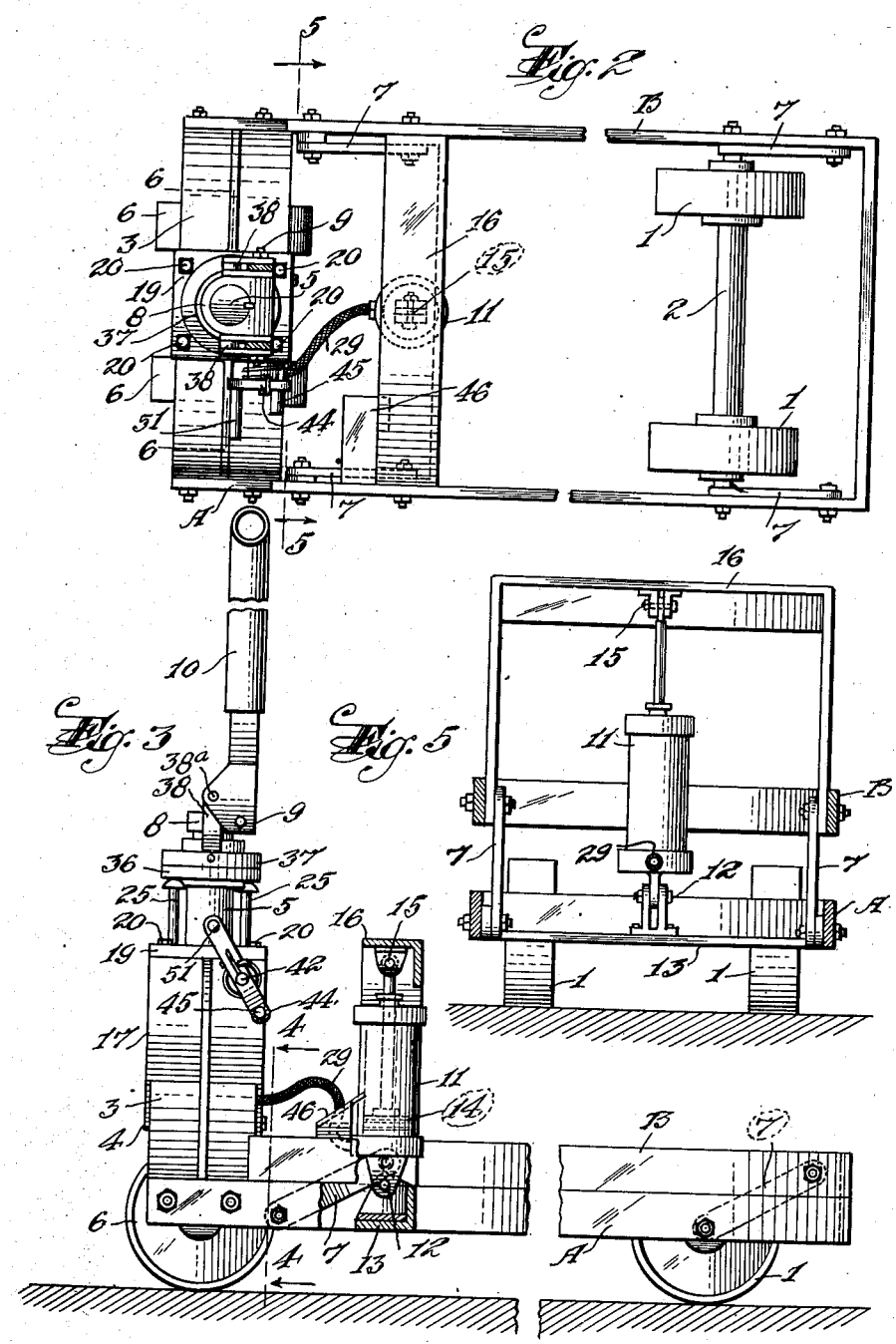

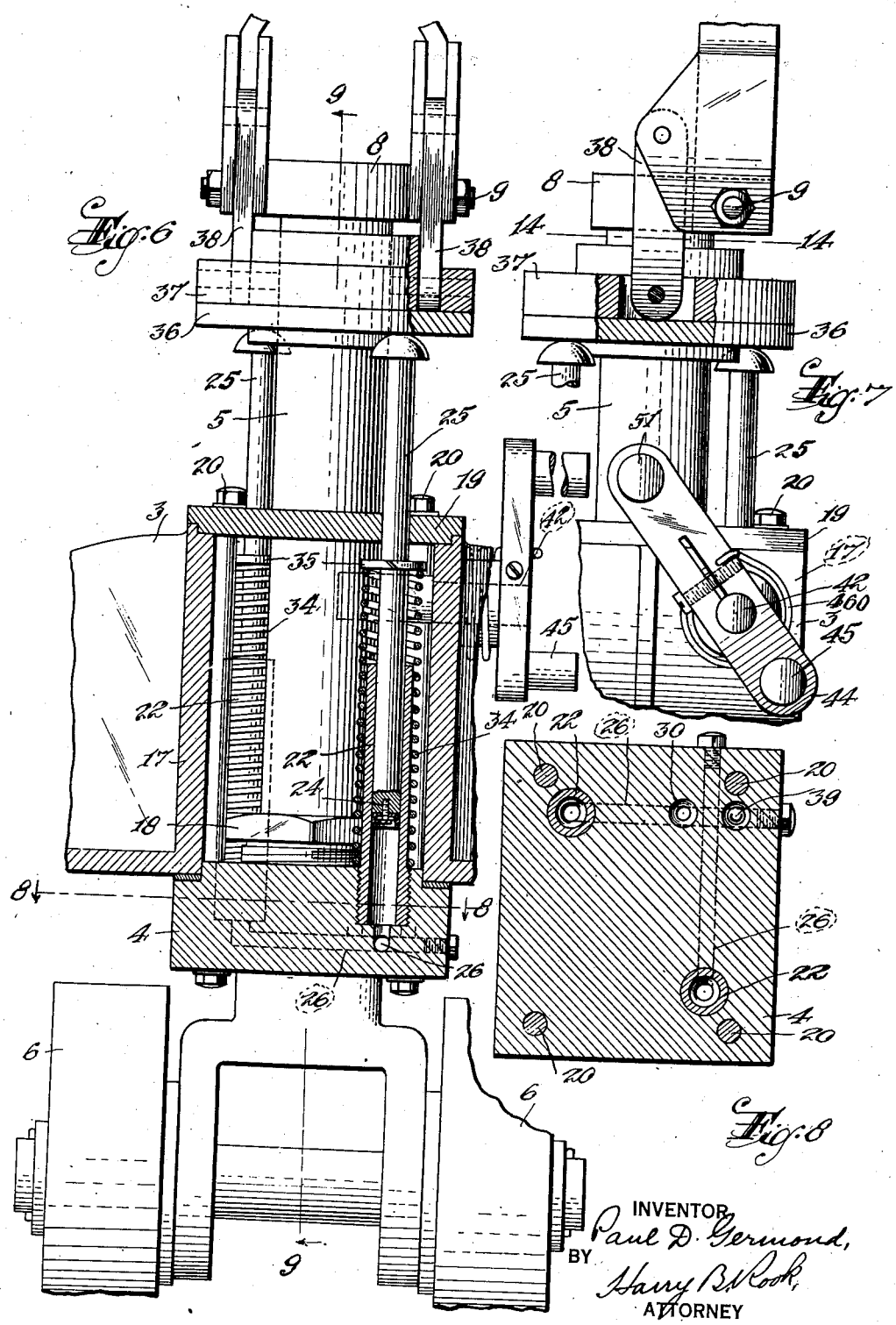

June 27, 1939.  P. D. GERMOND  2,163,675
HYDRAULIC LIFT TRUCK
Filed Sept. 26, 1936   5 Sheets-Sheet 4
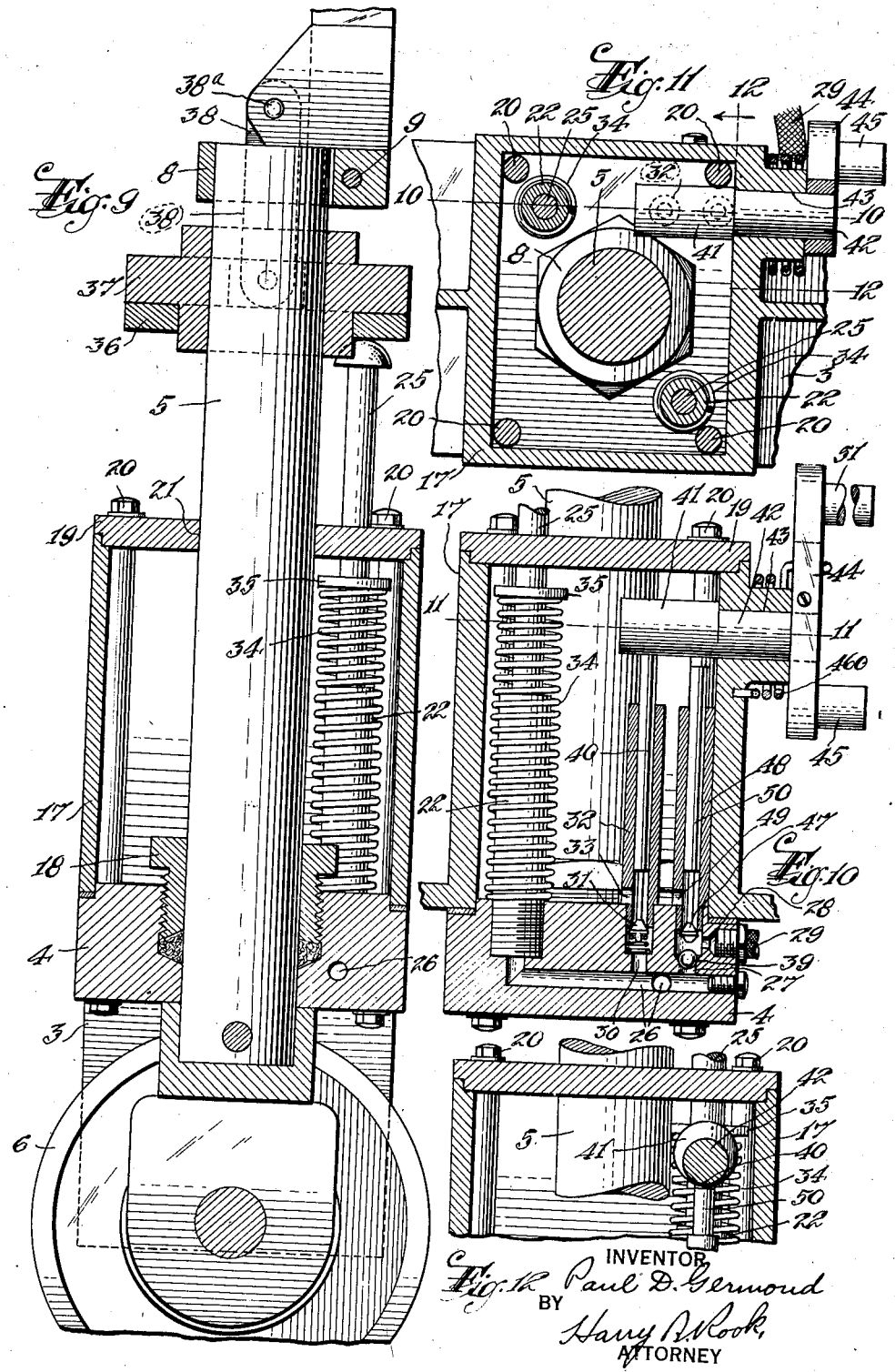
INVENTOR
Paul D. Germond
BY Harry B. Rook,
ATTORNEY

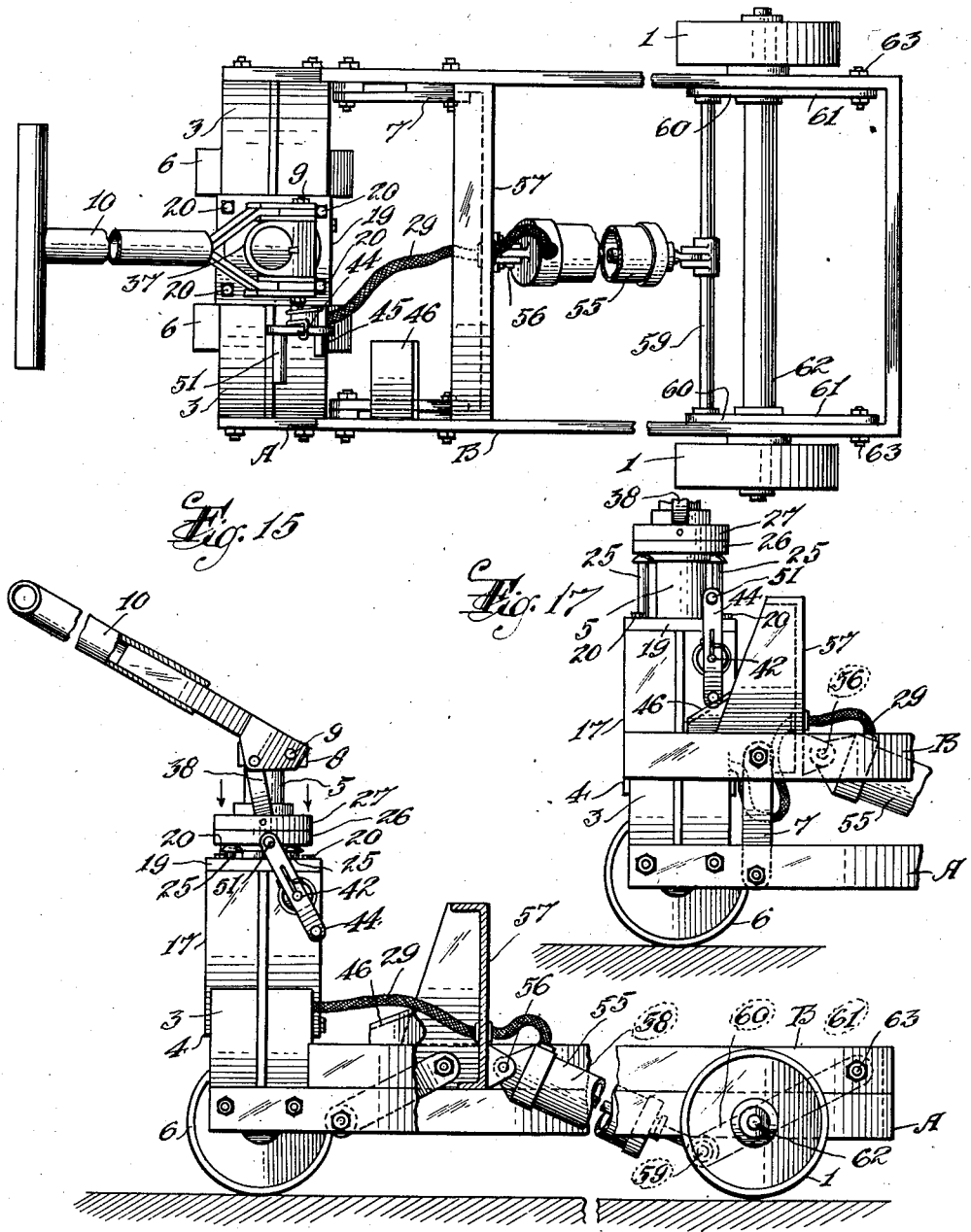

Patented June 27, 1939

2,163,675

UNITED STATES PATENT OFFICE 2,163,675

HYDRAULIC LIFT TRUCK

Paul D. Germond, Bayonne, N. J.

Application September 26, 1936, Serial No. 102,746

18 Claims. (Cl. 254—10)

This invention relates in general to hydraulic lift trucks or elevating trucks of the type including a main frame mounted on wheels and adapted to be moved about and steered by a draft handle and positioned beneath the load which is to be transported, the main frame carrying an elevating platform which is raised and lowered by hydraulic mechanism, fluid under pressure for which is supplied from a pump actuated by the draft handle.

One object of the invention is to provide such a hydraulic truck which shall include novel and improved pump mechanism that may be operated with a steering handle in any of its usual steering positions.

Another object is to provide in such a lift truck, novel and improved means for automatically limiting elevation of the platform under influence of the hydraulic pressure and for relieving the hydraulic lifting mechanism from pressure produced by oscillation of the draft handle after the elevating platform has been raised to its upper limit.

A further object is to provide in a lift truck of the character described, novel and improved means for releasing the hydraulic pressure from the lifting mechanism to permit lowering or descent of the elevating platform.

A further object is to provide a lift truck of the type having a wheeled frame including a steering swivel at the forward end revoluble about a vertical axis, with the draft handle mounted to rotate horizontally about said axis for steering the truck and also oscillatory in vertical planes, pump mechanism disposed around the axis of the swivel, and a novel and improved connection between the draft handle and the pump mechanism whereby the pump may be operated by oscillation of the handle in vertical planes and with the handle in any of its normal steering positions.

Other objects are to provide novel and improved inlet valve mechanism for controlling flow of liquid from the liquid reservoir to the pump and from the hydraulic lifting mechanism to the pump, a release valve mechanism for releasing the fluid from the hydraulic lifting mechanism to the reservoir, and a common operating mechanism for both of said valves, whereby the inlet valve shall be automatically opened upon rising of the elevating platform to a predetermined point so as to prevent further flow of liquid to the lifting mechanism from the pump and thereby obviate excess strain on the pump and lifting mechanism after the platform has been elevated to a predetermined point, and the release valve mechanism may be operated by a further manual movement of the valve operating mechanism so as to release the fluid from the hydraulic lifting mechanism to the reservoir and permit descent of the platform, and to obtain other advantages and results as will be brought out by the following description.

Referring to the accompanying drawings in which corresponding and like parts are designated throughout the several views by the same reference characters:

Figure 1 is a front elevational view of a hydraulic lift truck embodying my invention.

Figure 2 is a plan view of the truck.

Figure 3 is a side elevational view thereof with portions broken away and shown in section.

Figure 4 is a transverse sectional view on the line 4—4 of Figure 3.

Figure 5 is a similar view on the line 5—5 of Figure 2.

Figure 6 is a transverse sectional view on a greatly enlarged scale taken on the line 6—6 of Figure 2.

Figure 7 is a fragmentary side elevational view of the structure shown in Figure 6 with portions broken away and shown in section.

Figure 8 is a horizontal sectional view on the line 8—8 of Figure 6.

Figure 9 is a vertical sectional view taken on the line 9—9 of Figure 6.

Figure 10 is a vertical sectional view taken on the line 10—10 of Figure 11.

Figure 11 is a horizontal sectional view on the line 11—11 of Figure 10.

Figure 12 is a fragmentary vertical sectional view on the line 12—12 of Figure 11.

Figure 13 is a schematic sectional elevational view showing the successive steps in the operation of the valve actuating cam.

Figure 14 is a horizontal sectional view on the line 14—14 of Figure 7.

Figure 15 is a plan view of a modified form of the invention.

Figure 16 is a side elevational view of the truck shown in Figure 15 with portions broken away and shown in section and with the elevating platform in its lowermost position.

Figure 17 is a fragmentary side elevational view of the forward end of the truck showing the platform in its uppermost position.

Figure 18 is a fragmentary side elevational view of the inlet and relief valve operating lever showing a modification of the invention, Figure 19 is a fragmentary rear elevational view of the parts shown in Figure 18, and Figure 20 is a fragmentary transverse vertical sectional view showing a modified connection between the draft handle and the pump mechanism.

Specifically describing the embodiment of the invention illustrated in Figures 1 to 14 inclusive, the truck includes a main frame A of any suitable known construction which is mounted at the rear end on wheels 1 journaled on a transverse shaft 2. The forward end of the frame comprises a yoke 3 carrying a bolster block 4 in which is journaled a king pin 5 revoluble about a vertical axis and carrying at its lower end a pair of steering wheels 6, whereby the truck may be steered by rotation of the king pin 5.

An elevating and load sustaining platform B is mounted on the frame A in such a manner that the truck may be pushed beneath a load which is spaced from the floor as by means of skids, the platform being adapted to be elevated on the frame A to raise the load from the floor onto the truck. Any suitable means may be utilized for so mounting the platform on the frame, but in the present instance a pair of parallel links 7 is shown as connected between the frame and the platform at each end so that forward motion of the platform will cause oscillation of the links 7 to in turn raise the platform on the main frame.

For the purpose of drawing the truck from place to place and steering the same, the upper end of the king pin has a collar 8 secured thereto to which is pivotally connected at 9, one end of the steering or draft handle 10. The handle is capable of swinging about its pivot 9 in vertical planes and to revolve the king pin 5 by swinging of the handle in horizontal planes so as to steer the truck.

In accordance with the invention hydraulic mechanism is provided for elevating the platform B, and as shown, this mechanism may include a cylinder 11 pivotally connected at one end at 12 to a cross bar 13 on the main frame A, and a piston 14 reciprocable in the cylinder with the piston rod projecting from the other end of the cylinder and pivotally connected at 15 to a yoke 16 secured to the platform B adjacent the forward end thereof.

Hydraulic pressure is applied to the cylinder and piston device 11, 14, by a pump mechanism which may be actuated by the steering handle 10 in any of its steering positions. As shown, this pump mechanism includes a liquid reservoir 17 mounted on the bolster block 4 and surrounding the king pin 5. The side walls of the reservoir may be cast integrally with the yoke 3, and the bottom of the reservoir may be formed by the bolster block 4. A packing gland 18 surrounding the king pin prevents leakage of liquid from the reservoir between the king pin and the bolster block. The top of the reservoir may comprise a removable cap plate 19 which may be secured in position by bolts 20 which may also serve, as shown, to connect the yoke to the bolster block. The king pin projects through an opening 21 in the cap plate so that said plate serves as a bearing or journal for the king pin, cooperating with the bolster block.

Within the reservoir 17 are two pumps, each being shown as comprising a cylinder 22 secured to the bolster block and projecting upwardly therefrom, and a piston 24 mounted on a rod 25 which extends upwardly through the cap plate 19 which forms a bearing for the rod. The piston 24 is normally influenced upwardly by a spring 34 interposed between the bolster block and a collar 35 on the piston rod.

The upper ends of the piston rods 25 slidably engage a bearing collar 36 mounted on a sleeve 37 which is reciprocable on the king pin 5. The sleeve 37 is connected to the draft handle 10 by a pair of links 38, one at each side of the king pin, the pivotal connections 38a of the links with the draft handle being between the ends of the handle and adjacent the handle pivot 9 so that upon oscillation of the draft handle about its pivot 9, the sleeve 37 is reciprocated so as to in turn reciprocate the pump pistons. Due to the sliding relation of the collar 36 with the ends of the piston rods 25, the pump pistons may be reciprocated with the steering handle in any of its usual steering positions. If desired the piston rods may be positively connected to the collar 36, and the collar may have a swiveled but relatively longitudinally immovable connection with the sleeve 37, as shown in Figure 20. Here the bearing collar 36a is shown integrally connected to the piston rods 25 and held against longitudinal movement on the collar 37 by set screws 37a.

As shown, cylinders 22 are disposed approximately equidistantly from the axis of the king pin 5 and at diametrically opposite sides thereof to provide a balanced relation of the parts. This bolster block has a passage 26 leading from the lower end of each cylinder 22 and intersecting the other passage. Communicating with the passages 26 is an outlet valve port 27 for conducting liquid under pressure from the pumps through an outlet passage 28 to a flexible hose 29 which is connected to the cylinder 11 of the hydraulic lifting mechanism. Also communicating with the passages 26 is an inlet valve port 30 for establishing communication between the passages 26 and the reservoir 17. This inlet valve port is controlled by the valve 31 mounted in a valve case 32 secured in the bolster block. The valve case has an inlet duct 33 leading from the reservoir to the valve port 30.

The outlet valve port 27 is controlled by a ball check 39, and in operation of the mechanism so far described, when the piston rods 25 are moved upwardly, liquid from the reservoir is drawn through the inlet valve port 30, passages 26 into the pump cylinders 22, the ball check 39 being closed. Then as the pump pistons are forced downwardly by swinging of the handle 10, the valve 31 is closed and the check valve 39 opens to permit flow of liquid under pressure from the pump cylinders through passages 26, outlet valve port 27, outlet passage 28 through the hose 29 to the cylinder 11 of the hydraulic lifting mechanism, whereupon the piston 14 is forced upwardly so as to raise the elevating platform B.

To relieve the hydraulic lifting mechanism of hydraulic pressure from the pump when the elevating platform has reached a predetermined position in the elevation thereof, the inlet valve 31 is provided with a push rod 40 in the valve case 32 which cooperates with a rotatable cam 41 on a shaft 42 journaled in the side of the reservoir 17 as at 43. The axis of rotation of the cam 41 is approximately horizontal and the cam overlies the upper end of the push rod 40. The outer end of the shaft 42 has connected thereto a two armed lever 44, one arm of which has a laterally projecting stud 45 to be engaged by a suitable lug or projection 46 on the elevating platform as the platform is elevated. The cam 41 is normally positioned, as by action of gravity on the lever 44 or a spring 46b influencing the lever, so that the valve 31 may close. As the elevating platform reaches the predetermined position, the lug 46 engages the stud 45 to rotate the cam 41 in the direction of the arrow as indicated at X in Figure 13 and as shown by dot and dash lines in Figure 4 and the solid lines in Figure 17. This action forces the push rod 40 downwardly as shown at Y and Z of Figure 13, so as to open the valve 31, whereupon continued oscillation of the draft handle and reciprocation of the pump pistons will result in circulation of the liquid from the reservoir to the pump cylinders and back to the reservoir, and so on, without any influence on the hydraulic lifting mechanism 11, 14. Of course, the platform will be held in elevated position by the pressure in the cylinder 11 behind the piston 14 which is there held by the check valve 39.

The invention also contemplates mechanism for relieving the pressure from the cylinder 11 to permit descent of the platform. As shown, this mechanism includes a relief valve 47 controlling communication between the reservoir and the outlet passage 28. This valve is mounted in a valve case 48 like the case 32, and the case has a port 49 establishing communication between the outlet passage 28 and the reservoir 17. The valve 47 is normally closed by the pressure in the cylinder 11 of the lift mechanism and has a push rod 50 reciprocable in the case 48 and actuated by the cam 41 for opening the valve. The push rod 50 has such relation to the cam 41 that it will not be engaged by the cam until after the push rod 40 of the inlet valve 31 has been operated. In other words, the push rod is so related to the cam 41 that upon rotation of the cam in the direction of the arrows in Figure 13, the cam will first open the valve 31 and upon further rotation will engage the push rod 50 to open the valve 47, as illustrated at X, Y and Z in Figure 13. As shown, the cam is rotated to open the valve 47 by manual operation of the lever 44, for example by a push by the foot or hand of the operator on a second stud 51 on the arm of the lever 44 opposite the stud 45. When the valve 47 is so opened, the fluid may flow from the cylinder of the lift mechanism backwardly through the outlet passage 28 and port 49 into the reservoir so as to permit descent of the platform by action of gravity. In this connection, it will be understood that the reservoir is open to atmospheric pressure.

As above indicated the hydraulic lift mechanism may be arranged to operate the elevating platform in any suitable way. In Figures 15 to 17 inclusive I have shown another manner of connecting the hydraulic lift mechanism to the elevating platform. As shown, the lift mechanism includes the cylinder 55 pivotally connected at one end at 56 to a cross bar 57 on the elevating platform. The rear pair of parallel links 61, corresponding to the links 7, which connect the platform to the main frame, have extensions 60 at the side of the pivotal connection 62 of the links to the main frame opposite the connection 63 of the links to the platform. These extensions are connected by a cross rod 59 which is pivotally connected to the piston rod of the piston 58 in the cylinder 55. Upon inflow of fluid under pressure to the cylinder 55, pressure is exerted in opposite directions simultaneously on the cross bar 57 and the extension 60 of the links 61, so as to raise the elevating platform.

The structure and operation of this form of the truck are otherwise the same as that shown in Figures 1 to 14 inclusive.

In both forms of the invention, the piston rod springs 34 are preferably of such character as to counterbalance the handle 10 when the latter is released in any of its positions in the vertical planes of swinging of the handle.

In some instances it may be desirable to actuate the inlet valve 31 to relieve the cylinder and piston device of pressure from the pump before the elevating platform has been elevated to its uppermost limit. For example, the platform may be mounted to move a maximum distance of six inches, but under some circumstances it may be desirable to elevate the platform only three inches and then insure against the platform being further elevated by vertical swinging of the draft handle. To accomplish this result, the valve operating lever 44 may have pivotally mounted at 67 thereon a gravity pawl 65 to cooperate with a detent lug 66 on the yoke 3, the parts being so arranged that when the operating lever 44 is in position to permit closing of the inlet valve 31, as shown by heavy dot and dash lines in Figure 18, the pawl 65 is disposed at one side of the detent lug 66. After the elevating platform has been raised to a desired position intermediate its lowermost and uppermost positions, the lever 44 may be manually operated to swing the lever into the position shown by solid lines in Figure 18 so as to open the inlet valve 31. During this operation the pawl 65 is swung about its pivotal mounting 67 by engagement with the detent lug 66 and after having passed the detent lug, drops behind the latter by action of gravity so as to hold the lever in this position against the influence of the spring 460. To release the pawl from the lug 66, it is then merely necessary to continue swinging of the lever in the same direction until the pawl drops away from the detent lug, as shown by light dot and dash lines in Figure 18, and then permit the lever to swing under the influence of the spring 460 to its normal position. During this return swing of the lever pawl rides automatically idly over the detent lug. The parts may be proportioned in size as shown, so that the pawl may be disengaged from the detent lug without movement of the lever a sufficient distance to open the relief valve 47, although ordinarily it will be the practice to open the relief valve 47 to permit descent of the platform before any necessity arises for permitting closing of the inlet valve 31 for the next elevating operation.

Other modifications and changes in the details of structure of the truck will occur to those skilled in the art as within the spirit and scope of the invention.

Having thus described my invention, what I claim is:

1. A hydraulic truck comprising a wheeled main frame, an elevating platform movably mounted thereon, hydraulic mechanism for moving said platform on the main frame including a cylinder and piston device connected to the main frame and the platform, a reservoir, a pump mechanism supplying fluid to said cylinder and piston device, a passage and a valve therein for controlling flow of fluid from the reservoir to the pump and vice versa, a valved passage communicating with the first passage to supply fluid from the pump to said cylinder and piston device, a passage having a valve therein communicating with said reservoir and said cylinder and piston device, and a common means for automatically operating the first valve at a predetermined time during the elevation of the platform to permit circulation of fluid back and forth between the pump and the reservoir without influence upon said cylinder and piston device and for thereafter operating said second valve to permit flow of fluid from the cylinder and piston device directly to the reservoir and allow descent of the platform.

2. The hydraulic truck set forth in claim 1 wherein said means for operating said valves includes a cam, means for actuating it including a part engaged by the platform at a predetermined point in the elevation of the platform to operate the first valve, and means for thereafter further actuating the cam to operate the second valve.

3. A hydraulic truck comprising a wheeled main frame, an elevating platform movably mounted thereon, hydraulic mechanism for moving said platform on the main frame including a cylinder and piston device connected to the main frame and the platform, a reservoir, a pump mechanism supplying fluid to said cylinder and piston device, a passage and a valve therein for controlling flow of fluid from the reservoir to the pump and vice versa, a valved passage communicating with the first passage to supply fluid from the pump to said cylinder and piston device, a passage and a valve therein communicating with said reservoir and said cylinder and piston device, and a common means for operating said valves successively to permit circulation of fluid back and forth between said reservoir and said pump without influence upon the cylinder and piston device and to permit flow of fluid from said cylinder and piston device directly to said reservoir, respectively.

4. The hydraulic truck set forth in claim 3 wherein said common means comprises a rotatable cam to successively actuate said valves upon continued rotation of the cam in the same direction, and means for rotating the cam.

5. The hydraulic truck set forth in claim 3 wherein said common means comprises a rotatable cam to successively actuate said valves upon continued rotation of the cam in the same direction, and means for rotating the cam in said direction as the platform reaches a predetermined point in its elevation to operate the first valve, and means for thereafter at will continuing rotation of said cam in said direction to operate the second valve.

6. A hydraulic truck comprising a wheeled main frame, an elevating platform movably mounted thereon, hydraulic mechanism for moving said platform including a cylinder and piston device connected to the main frame and the platform, a reservoir, a pump, and means for permitting flow of fluid from the reservoir to the pump and vice versa, from the pump to the cylinder and piston device and from the cylinder and piston device to the reservoir, said means including passages and valves and a common means for operating said valves selectively to permit circulation of fluid back and forth between said reservoir and said pump without influence upon said cylinder and piston device and to permit flow of fluid from said cylinder and piston device directly to said reservoir.

7. A hydraulic truck comprising a wheeled main frame, an elevating platform movably mounted thereon, hydraulic mechanism for moving said platform including a cylinder and piston device connected to the main frame and the platform, a reservoir, a pump, a passage leading from said reservoir to said pump, a valve in said passage normally to permit flow of fluid from the reservoir to said pump but to prevent flow in the other direction, a passage and a check valve therein to permit flow of fluid from said pump to said cylinder and piston device but preventing flow in the opposite direction, and means for operating said first valve to permit flow of fluid back and forth between the reservoir and said pump and continued operation of the pump without influence upon said cylinder and piston device.

8. A hydraulic truck comprising a wheeled main frame, an elevating platform movably mounted thereon, hydraulic mechanism for moving said platform including a cylinder and piston device connected to the main frame and the platform, a reservoir, a vertical pump cylinder within said reservoir and secured to the bottom thereof, a piston in said cylinder, means for reciprocating said piston, a passage in the bottom of said reservoir leading from said reservoir to said pump cylinder, a vertically movable valve in said passage normally to permit flow of fluid from said reservoir to said pump cylinder but to prevent flow in the other direction, a vertical valve case secured to the bottom of the reservoir, a push rod in said case to operate said valve, and a rotatable cam journaled in the walls of the reservoir to cooperate with said push rod and operate said valve to permit flow of fluid back and forth between said reservoir and said pump cylinder, and a second passage in the bottom of said reservoir and a check valve therein to permit flow of fluid from said pump cylinder to said cylinder and piston device but to prevent flow in the opposite direction.

9. The hydraulic truck set forth in claim 8 with the addition of a passage communicating with said reservoir and said cylinder and piston device, and a vertically operable relief valve therein normally to prevent flow of fluid from said cylinder and piston device to said reservoir, a vertical valve case secured to the bottom of said reservoir, and a push rod in said case to cooperate with said cam whereby said relief valve is operated by the cam to permit flow of fluid from said cylinder and piston device directly to said reservoir.

10. A hydraulic truck including a wheeled main frame having a steering swivel rotatable about a vertical axis, an elevating platform movably mounted thereon, a hydraulic mechanism including a cylinder and piston device for moving said platform, a pump mechanism mounted on said main frame including a vertical pump piston rod disposed adjacent the axis of said swivel, means for conducting fluid from said pump mechanism to said cylinder and piston device, a draft handle mounted on said swivel to swing in vertical planes and to rotate in horizontal planes to turn the swivel for steering the truck, and means to reciprocate said piston rod upon oscillation of said handle in vertical planes in any steering position, said means including an operative connection between said handle and said piston rod comprising a member vertically movable coaxially with said swivel.

11. A hydraulic truck including a wheeled main frame having a steering swivel rotatable about a vertical axis, an elevating platform movably mounted thereon, a hydraulic mechanism including a cylinder and piston device for moving said platform, a pump mechanism mounted on said main frame including a vertical pump piston rod disposed adjacent the axis of said swivel, means for conducting fluid from said pump mechanism to said cylinder and piston device, a draft handle mounted on said swivel to swing in vertical planes and to rotate in horizontal planes to turn the swivel for steering the truck, and an operative connection between said handle and said piston rod including a member vertically movable coaxially with said swivel, and means connecting said handle to said member to reciprocate the latter upon oscillation of the handle in vertical planes, there being an operative engagement between said member and said piston rod so that said member can rotate coaxially with said swivel relative to said piston rod and said piston rod can be actuated by said member upon oscillation of said handle with the latter in any horizontal angular relation to the swivel axis to force fluid from said pump cylinder to said cylinder and piston device.

12. A hydraulic truck including a wheeled main frame having a steering swivel rotatable about a vertical axis, an elevating platform movably mounted thereon, a hydraulic mechanism including a cylinder and piston device for moving said platform, a pump mechanism mounted on said main frame including a reservoir in the line of axis of said swivel, a vertical pump cylinder and cooperating piston and piston rod in said reservoir, valved passages establishing communication between said reservoir and said pump cylinder and between said pump cylinder and said cylinder and piston device, a draft handle mounted on said swivel to swing in vertical planes and to rotate in horizontal planes to turn said swivel for steering the truck, and an operative connection between said handle and said pump piston including swivel related parts so that said pump piston can be reciprocated by oscillation of the handle in vertical planes in any of the steering positions of the handle.

13. A hydraulic truck including a wheeled main frame having a steering swivel rotatable about a vertical axis, an elevating platform movably mounted thereon, a hydraulic mechanism including a cylinder and piston device for moving said platform, a pump mechanism mounted on said main frame including a reservoir in the line of axis of said swivel, a plurality of vertical cylinders and associated pistons and piston rods mounted in said reservoir equidistantly from the axis of said swivel, valved passages establishing communication between said reservoir and said pump cylinders and between the latter and said cylinder and piston device, a draft handle mounted on said swivel to swing in vertical planes and to rotate in horizontal planes to turn said swivel for steering the truck, and an operative connection between said handle and all of said piston rods to actuate the latter to force fluid from said pump cylinder to said cylinder and piston device upon oscillation of the handle in vertical planes.

14. A hydraulic truck including a wheeled main frame having a steering swivel rotatable about a vertical axis, an elevating platform movably mounted thereon, a hydraulic mechanism including a cylinder and piston device for moving said platform, a pump mechanism mounted on said main frame including a vertical pump piston rod disposed adjacent the axis of said swivel, means for conducting fluid from said pump mechanism to said cylinder and piston device, a draft handle mounted on said swivel to swing in vertical planes and to rotate in horizontal planes to turn the swivel for steering the truck, and an operative connection between said handle and said piston rod including a member vertically movable coaxially with said swivel, said handle being connected to said member, and said member engaging said piston rod so that said member can rotate coaxially with said swivel relative to said piston rod and said piston rod can be actuated to force fluid from said pump cylinder to said cylinder and piston device upon oscillation of the handle in vertical planes and in any of its steering positions.

15. The hydraulic truck set forth in claim 3 wherein said common means comprises a rotatable device to successively actuate said valves upon continued rotation of the device in the same direction, means for manually rotating said device in said direction to operate the first valve and for thereafter at will manually continuing rotation of the device to operate the second valve, means for normally yieldingly influencing said device in the other direction, and a detent mechanism for automatically holding said device in the position to open the first valve and being automatically released upon continued movement of the device in the direction to open the second valve so as to permit return of the device to normal position.

16. A hydraulic truck including a wheeled main frame, an elevating platform movably mounted thereon, a hydraulic lift mechanism for moving said platform, a reservoir on said main frame, a plurality of vertical pump cylinders and associated pistons and piston rods mounted in said reservoir, means for allowing fluid to pass from the reservoir to said pump cylinders and from the pump cylinders to said lift mechanism, a draft handle connected to said main frame to swing in vertical planes, and means including an operative connection between said handle and all of said piston rods to simultaneously reciprocate said rods on oscillation of said handle and supply fluid under pressure to said lift mechanism, said operative connection between the handle and said piston rods including a guide whose axis is vertical and equi-distant from all of said rods, and a member connected to said handle and vertically movable on said guide upon oscillation of said handle and operatively engaging all of said piston rods to actuate said piston rods in the direction to supply fluid under pressure to said lift mechanism.

17. A hydraulic truck comprising a wheeled main frame, an elevating platform movably mounted thereon, hydraulic mechanism for moving said platform on the main frame including a cylinder and piston device connected to the main frame and the platform, a reservoir, a pump mechanism supplying fluid to said cylinder and piston device, a common passage and a common valve therein for controlling flow of fluid from the reservoir to the pump and from the pump to the reservoir, a valved passage communicating with the first passage to supply fluid from the pump to said cylinder and piston device, and manually operable means for at will operating said valve in the first passage to permit circulation of fluid back and forth between the pump and the reservoir and continued operation of the pump mechanism without influence upon said cylinder and piston device.

18. A hydraulic truck comprising a wheeled main frame, an elevating platform movably mounted thereon, hydraulic mechanism for moving said platform on the main frame including a cylinder and piston device connected to the main frame and the platform, a reservoir, a pump mechanism supplying fluid to said cylinder and piston device, a common passage and a common valve therein for controlling flow of fluid from the reservoir to the pump and from the pump to the reservoir, a valved passage communicating with the first passage to supply fluid from the pump to said cylinder and piston device, means for operating said valve in the first passage to permit circulation of fluid back and forth between the pump and reservoir, and means on said platform to actuate the last-named means during elevation of the platform as the platform reaches a predetermined point and thereafter permit continued operation of the pump without influence thereof upon the cylinder and piston device.

PAUL D. GERMOND.